(12) United States Patent
Woolsey

(10) Patent No.: US 12,213,622 B2
(45) Date of Patent: Feb. 4, 2025

(54) DEVICE FOR ROASTING FOOD

(71) Applicant: Sherry Marlene Small, Petersburg, IN (US)

(72) Inventor: Anthony Malcolm Woolsey, Petersburg, IN (US)

( * ) Notice: Subject to any disclaimer, the term of this patent is extended or adjusted under 35 U.S.C. 154(b) by 746 days.

(21) Appl. No.: 17/386,988

(22) Filed: Jul. 28, 2021

(65) Prior Publication Data

US 2022/0031118 A1 Feb. 3, 2022

Related U.S. Application Data

(60) Provisional application No. 63/058,657, filed on Jul. 30, 2020.

(51) Int. Cl.
*A47J 37/04* (2006.01)
*A47J 33/00* (2006.01)

(52) U.S. Cl.
CPC .............. *A47J 37/049* (2013.01); *A47J 33/00* (2013.01)

(58) Field of Classification Search
CPC ...... A47J 37/049; A47J 37/07; A47J 37/0786; A47J 33/00; A47J 43/18

USPC .......................................... D7/683, 684, 688
See application file for complete search history.

(56) References Cited

U.S. PATENT DOCUMENTS

| | | | | |
|---|---|---|---|---|
| 2,804,819 | A | * | 9/1957 | Whealton ............. A47J 37/049 |
| | | | | D7/669 |
| 3,745,910 | A | * | 7/1973 | Delamater ............. A47J 43/18 |
| | | | | 99/419 |
| 5,628,244 | A | * | 5/1997 | Holliday .................. A47J 43/18 |
| | | | | 99/421 A |
| 6,085,642 | A | * | 7/2000 | Terry ...................... A47J 43/18 |
| | | | | 99/421 A |
| D474,379 | S | * | 5/2003 | Nelson ........................... D7/683 |
| 2008/0061570 | A1 | * | 3/2008 | Dockins .................. A47J 43/18 |
| | | | | 294/4 |
| 2018/0014691 | A1 | * | 1/2018 | Gergen .................. A47J 37/049 |
| 2020/0260908 | A1 | * | 8/2020 | Wells ...................... A47J 43/18 |

\* cited by examiner

*Primary Examiner* — Justin C Dodson
(74) *Attorney, Agent, or Firm* — Faegre Drinker Biddle & Reath LLP

(57) ABSTRACT

The present invention relates generally to cooking devices and, more particularly, to an apparatus comprising a shaft and a food engagement assembly for supporting and/or roasting food over a source of heat, such as a campfire, burning coals or the like.

21 Claims, 5 Drawing Sheets

DEVICE FOR ROASTING FOOD

CROSS-REFERENCE TO RELATED APPLICATION

The present application claims priority to U.S. Provisional Patent Application No. 63/058,657, filed Jul. 30, 2020, the entire enclosure of which is incorporated herein by reference.

FIELD

The present invention relates generally to cooking devices and, more particularly, to an apparatus for supporting and/or roasting food over a source of heat, such as a campfire, burning coals or the like.

BACKGROUND

When cooking a food item such as meats and vegetables over an open flame, they are impaled on a pointed apparatus including a skewer, a stick, or the like. Such a skewer, for example, is held by a user over the flame. One shortcoming to the use of skewers for this purpose is that the food item sometimes falls from the skewer during cooking, or brushes against the burning logs or coals, thus contaminating the food. Further, care must be taken to turn the skewer frequently. Otherwise, the food item will become burned and blackened on the side nearest the flame. With existing skewers, it is difficult to evenly rotate the food item over an open flame so as to cook all around it equally well. A further drawback to a conventional skewer is the danger of the user, especially children poking one another in the eye or body with their points.

Due to the shortcomings of using existing skewers and/or sticks, development of a new innovative device(s) is much needed to enhance the ease of use of the food roasting apparatus. It is to such a roasting device that the present invention is directed.

SUMMARY

A first illustrative embodiment includes a device for roasting a food item, including: a shaft; a food engagement assembly comprising: a pointed apparatus including, but not limited to, a stick, a skewer, a fork, or the like at one end of the shaft; a cage including, but not limited to, a plurality of spirals, a basket, or the like formed adjacent to the pointed apparatus, the pointed apparatus extending outwardly toward a distal end of the plurality of spirals; and an operator actuation assembly comprising: at least one rod reciprocally movable within the plurality of spirals; and a stopper attached to one end of the at least one rod movable within the plurality of spirals and having an aperture configured to receive the pointed apparatus. As used herein, the term "food item" refers to any meats, hot dogs, wieners, sausages, frankfurters, vegetables, or the like.

A second illustrative embodiment includes the device of the first illustrative embodiment, further including a handle affixed to an end of the shaft opposite the pointed apparatus.

A third illustrative embodiment includes the device of the second illustrative embodiment, wherein the handle can be a metal, plastic, or wooden handle.

A fourth illustrative embodiment includes the device of any one of the first to the third illustrative embodiments, wherein the shaft, the pointed apparatus, and the plurality of spirals are formed of a unitary construction.

A fifth illustrative embodiment includes the device of any one of the first to the fourth illustrative embodiments, wherein the plurality of spirals is concentrically aligned along a common axis.

A sixth illustrative embodiment includes the device of any one of the first to the fifth illustrative embodiments, wherein the pointed apparatus has an end point centered at the common axis of the plurality of spirals.

A seventh illustrative embodiment includes the device of any one of the first to the sixth illustrative embodiments, wherein the plurality of spirals has at least one spiral of lesser inner diameter than a remainder of the plurality of spirals.

An eighth illustrative embodiment includes the device of the seventh illustrative embodiment, wherein the at least one spiral of lesser inner diameter is tapering toward at a proximal end of the pointed apparatus.

A ninth illustrative embodiment includes the device of any one of the first to the eighth illustrative embodiments, wherein the stopper has a diameter greater than the at least one spiral of lesser inner diameter and lesser than the inner diameter of the remainder of the plurality of spirals.

A tenth illustrative embodiment includes the device of the first to the ninth illustrative embodiments, wherein the stopper stays within the plurality of spirals.

An eleventh illustrative embodiment includes the device of any one of the first to the tenth illustrative embodiments, wherein the operator actuation assembly further comprising a second stopper attached to a second end of the at least one rod movable along the common axis and having an aperture configured to receive the shaft.

A twelfth illustrative embodiment includes the device of the eleventh illustrative embodiment, wherein the second stopper has a diameter greater than the at least one spiral of lesser inner diameter, and wherein the at least one spiral of lesser inner diameter restricts the entry of the second stopper toward the plurality of spirals.

A thirteenth illustrative embodiment includes any one of the first to the twelfth illustrative embodiment, wherein the operator actuation assembly is configured to shift the food engagement assembly from a charged position to a released position.

A fourteenth illustrative embodiment includes any one of the first to the thirteenth illustrative embodiment, further comprising an operator actuation input connected to the handle and/or the shaft mechanically and/or electronically.

A fifteenth illustrative embodiment includes any one of the first to the fourteenth illustrative embodiments, wherein the shaft, the pointed apparatus, and the plurality of spirals are made of stainless steel.

A sixteenth illustrative embodiment includes any one of the first to the fifteenth illustrative embodiments, each spiral of the plurality of spirals are connected to each other by a support member.

A seventeenth illustrative embodiment includes any one of the first to the sixteenth illustrative embodiments, wherein the pointed apparatus includes a stick, a skewer, a fork, a sharpened material, or any combination thereof.

An eighteenth illustrative embodiment includes any one of the first to the seventeenth illustrative embodiments, wherein the pointed apparatus is made of metal, wood, plastic or any combination thereof.

A nineteenth illustrative embodiment includes any one of the first to the eighteenth illustrative embodiments, further comprising an operator actuation input configured to control an operation configuration of the food engagement assembly, wherein the operation configuration includes a charged configuration and a released configuration.

A twentieth illustrative embodiment includes the nineteenth illustrative embodiment, wherein the stopper is positioned at a proximal end of the pointed apparatus in the charged configuration to allow a food item to engage the pointed apparatus within the plurality of spirals.

A twenty first illustrative embodiment includes any one of the nineteenth to the twentieth illustrative embodiments, wherein the stopper is positioned at a distal end of the pointed apparatus in the released configuration to allow a food item to disengage from the pointed apparatus.

A twenty second illustrative embodiment includes any one of the nineteenth to the twenty first illustrative embodiments, wherein the stopper is configured to move along the pointed apparatus toward a proximal end of the plurality of spirals upon a transition from the released configuration to the charted configuration.

A twenty third illustrative embodiment includes any one of the nineteenth to the twenty second illustrative embodiments, wherein the stopper is configured to move along the pointed apparatus toward a distal end of the plurality of spirals upon a transition from the charged configuration to the released configuration.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION

Figure 1:
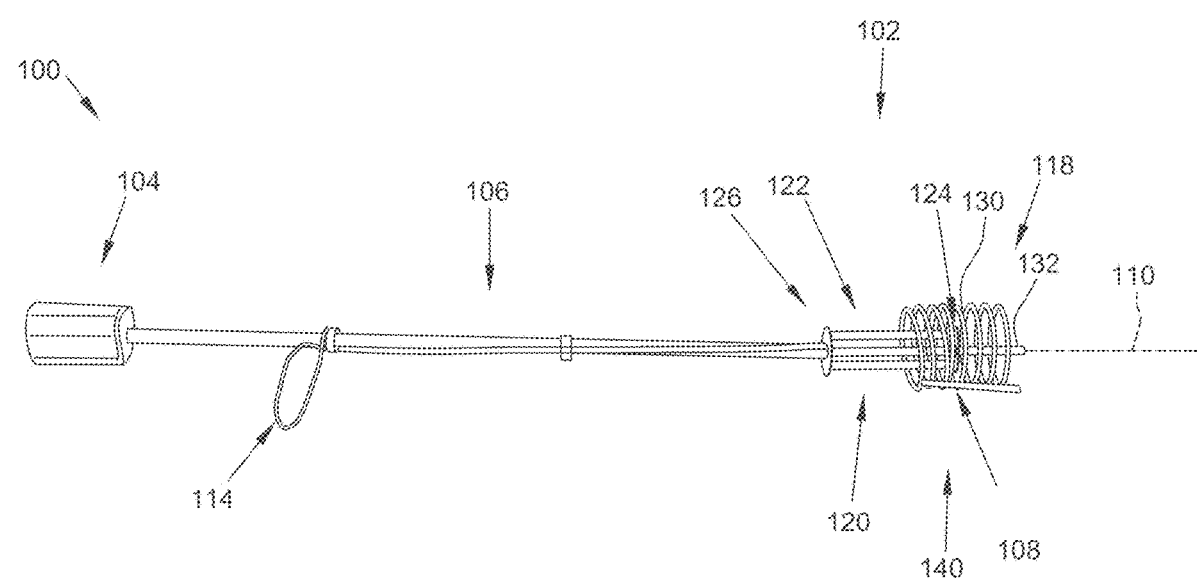
FIG. 1 is a perspective view of a roasting device in accordance with some illustrative embodiments.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "connects", "connected", "connecter" and variations thereof are used to include both arrangements wherein the two or more components are in direct physical contact and arrangements wherein the two or more components are not in direct contact with each other (e.g., the components are "connected" via at least a third component), but yet still cooperate or interact with each other.

In some instances, throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Referring to FIG. 1, a roasting device 100 according to an illustrative embodiment of the present disclosure includes a handle 104, a shaft 106, a food engagement assembly 102, and an operator actuation assembly 120. The food engagement assembly 102 is supported at one end (i.e., distal end) of the shaft 106 opposite the handle 104 and further includes a skewer 130 and a cage 140 illustratively defined by a plurality of spirals 108 formed around the skewer 130. The tapered end point 132 of skewer 130 is adapted to secure a food item within an inner portion of the plurality of spirals 108. In use, the food item may engage the skewer 130 along a longitudinal axis 110 toward a proximal end 112 of the plurality of spirals 108 to be positioned within at least some inner portion of the plurality of spirals 108. As explained herein in more detail, in certain configurations, the operator actuation assembly 120 may be actuated to move a first stopper 124 toward a distal end 118 of plurality of spirals 108 along the longitudinal axis 110.

In the illustrative embodiment, the shaft 106, the skewer 130, and the plurality of spirals 108 are of a unitary construction. In particular, the shaft 106, the skewer 130, and the plurality of spirals 108 are formed from a stainless-steel wire. Such a wire should be of sufficient diameter so as to allow roasting device 100 to be sufficiently rigid for the cooking of a food item including, but not limited to, sausages, meats, and vegetables. However, it should be appreciated that, in some embodiments, the shaft 106, the skewer 130, and the plurality of spirals 108 may be separate components and/or may be made of different materials.

Figure 2:
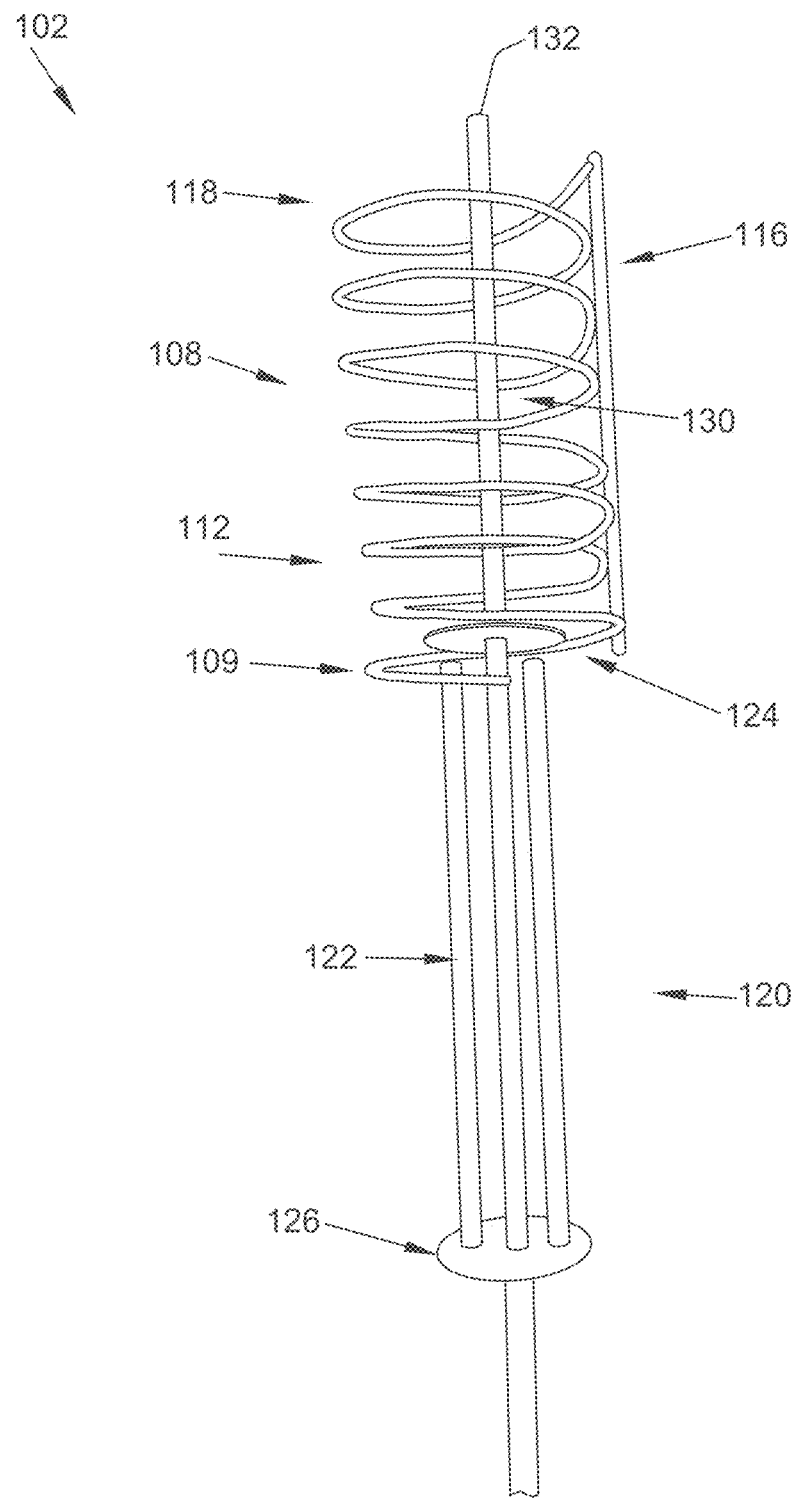
FIG. 2 is a perspective view of a food engagement assembly of the illustrative roasting device of FIG. 1 in a charged configuration.

In the illustrative embodiment, the cage 140 is defined by the plurality of spirals 108, illustratively including a total of eight spirals concentrically aligned along a longitudinal axis 110. However, it should be appreciated that, in some embodiments, a roasting device may have a different number of spirals (e.g., fewer or more than eight) of the plurality of spirals 108. The end point 132 of skewer 130 is centered along the longitudinal axis 110. A first spiral 109 of plurality of spirals 108 is located at a proximal end of plurality of spirals 108 and has a shape of less than a full circle and connects the plurality of spirals to the skewer 130, as shown in FIG. 2.

In some embodiments, the first spiral has an inner diameter less than those inner diameters of a remainder of the plurality of spirals. Additionally, the first spiral may be tapering toward a distal end of the skewer 130. The result of tapering allows first stopper 124 to stay inside of plurality of spirals 108 and serve as a guide for the attachment of a food item onto skewer 130. The inner diameter of spirals and axial length of spirals are configured to define a receptacle of sufficient dimensions to receive typical food items within the cage 140.

In the illustrative embodiment, the operator actuation assembly 120 includes an operator actuation input 114, a first stopper 124, a second stopper 126, and rods 122 that extend between the first stopper 124 and the second stopper 126. Specifically, the first stopper 124 is attached to distal ends of the rods 122 and has a first aperture 134 that is configured to receive the skewer 130. Additionally, the second stopper 126 is attached to proximal ends of the rods 122 and has a second aperture 136 that is configured to receive the shaft 106. In use, the rods 122 and the first stopper 124 are reciprocally movable within the plurality of spirals 108 along a common axis (i.e., the longitudinal axis 110). As described above, the food item may engage the skewer 130 along a longitudinal axis 110 toward the proximal end 112 of the plurality of spirals 108. The first stopper 124 is adapted to prevent the food item from further sliding toward the proximal end of the skewer 130, such that the food item may positioned within the cage 140 as defined the inner portion of the plurality of spirals 108. The second stopper 126 is adapted to prevent the first stopper 124 from further sliding toward the distal end of the skewer 130, such that in the released configuration, the food item is fully discharged while the first stopper 124 is still intact. In some embodiments, each spiral of the plurality of spirals may be connected to each other by a support member 116.

Additionally, the operator actuation input 114 is adapted to control an operation configuration of the roasting device 100, as described in detail below. In the illustrative embodiment, the operator actuation input 114 is illustrated as a steel wire knot. However, in some embodiments, other user actuatable input devices may be used including handles, levers, and other suitable devices for interaction with an operator. In the illustrative embodiment, the operator actuation input 114 is made of steel. However, in some embodiments, the operator actuation input 114 may be made of other metals. It should also be appreciated that, in some embodiments, the operator actuation assembly 120 may include fewer or more rods 122 that extend between the first and second stoppers 124 and 126.

The illustrative roasting device 100 has two operation configurations. As shown in FIG. 2, a first operation configuration is a charged configuration, wherein the first stopper 124 is fully moved toward the proximal end of the skewer 130 and the first stopper 124 is in contact or in near contact with the first spiral 109 (i.e., axially positioned adjacent the first spiral 109). In the charged configuration, the food item is fully engaged with the skewer 130. However, it should be appreciated that, in some embodiments, the first stopper 124 may be positioned near the first spiral 109 in the charged configuration.

Figure 3:
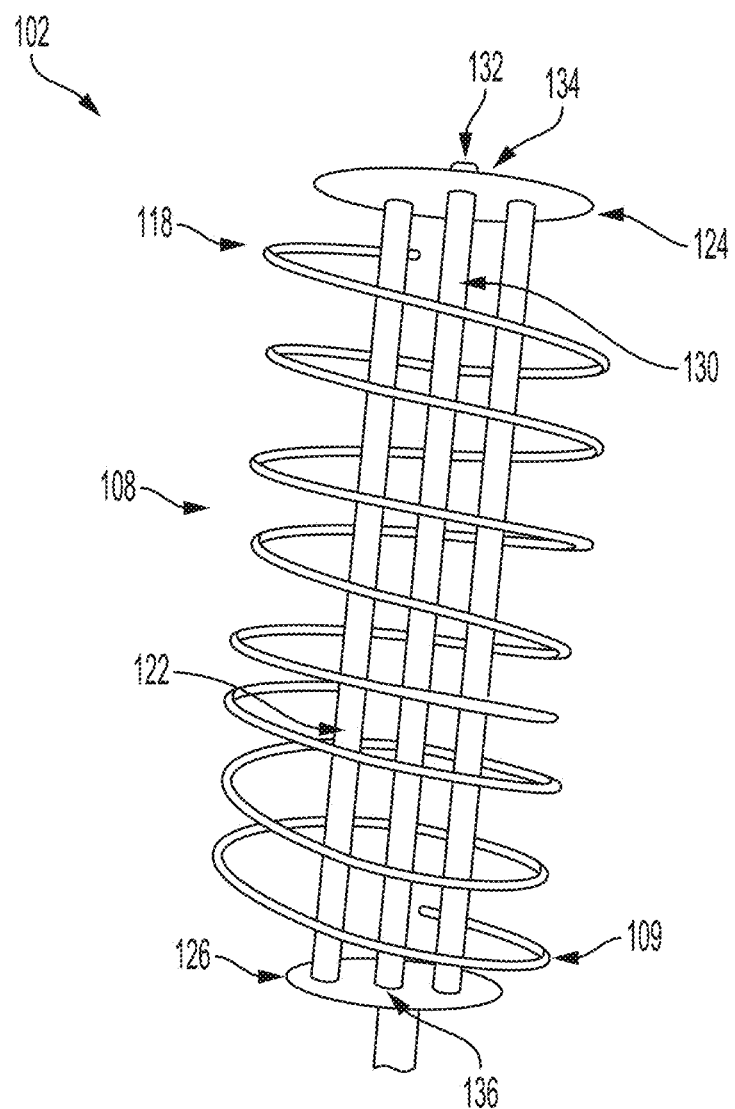
FIG. 3 is a perspective view of a food engagement assembly of the roasting device in a released configuration.

As shown in FIG. 3, a second operation configuration is a released configuration, wherein the first stopper 124 is fully extended toward the distal end of skewer 130 and the second stopper 126 is in contact or in near contact with the first spiral 109 (i.e., axially positioned adjacent the first spiral 109). In the released configuration, the food item is fully discharged (or at least mostly discharged) from the skewer 130.

Figure 4A:
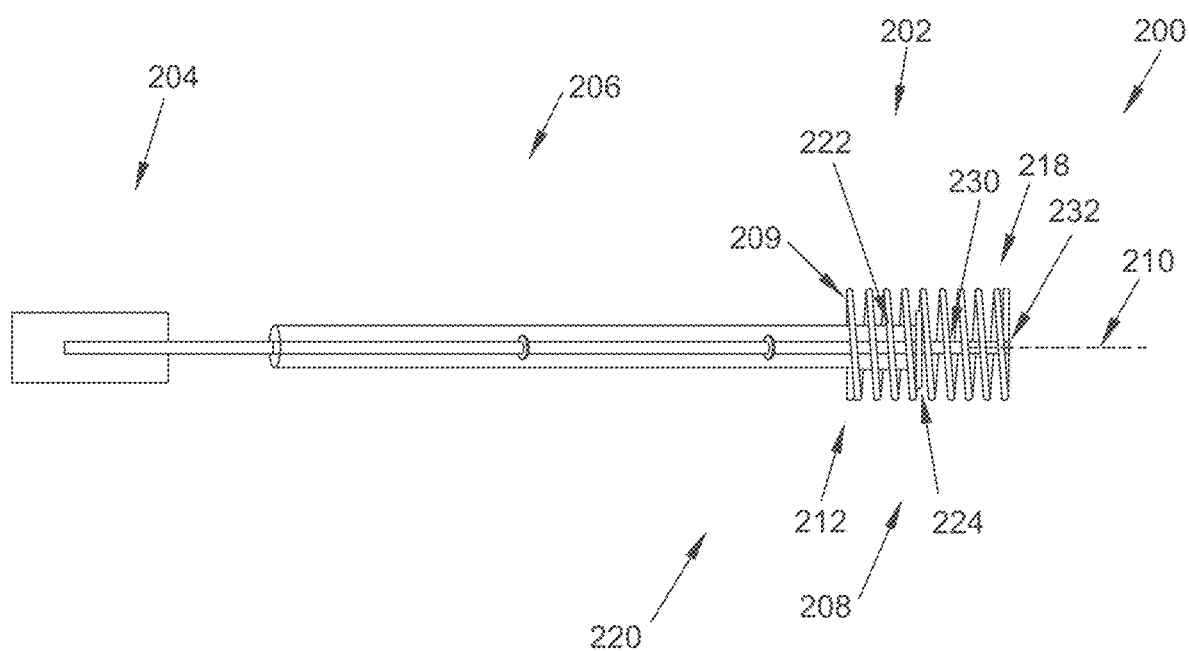
FIG. 4A is a perspective view of another illustrative roasting device with a handle, a shaft, and a food engagement assembly.
Figure 4B:
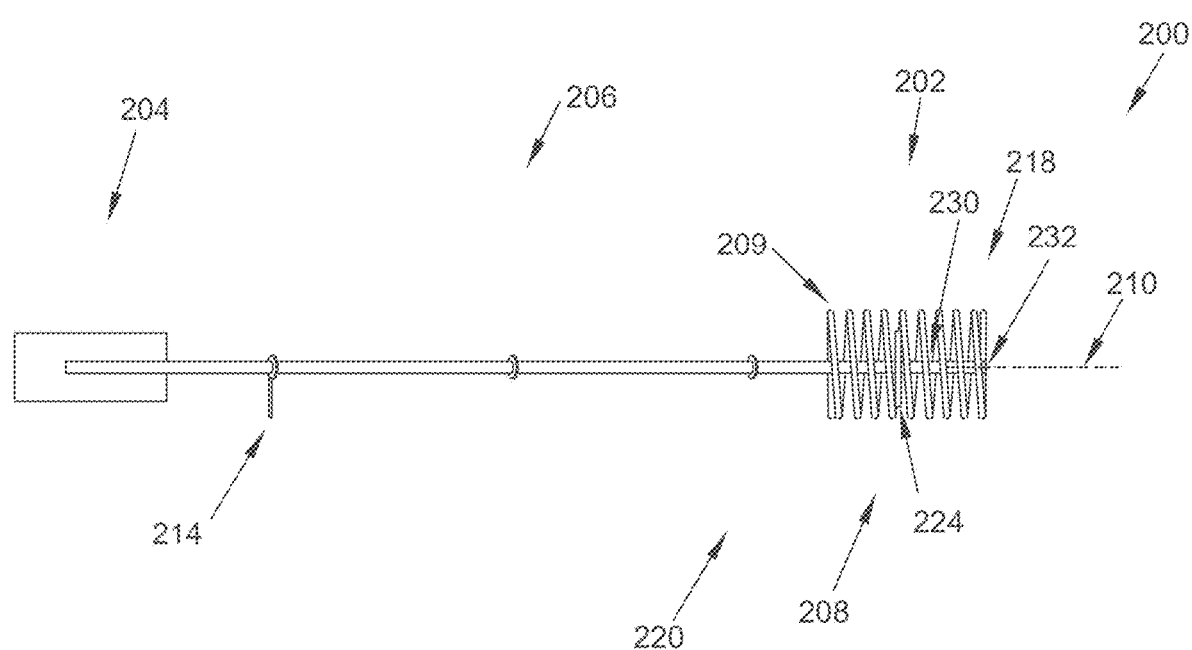
FIG. 4B is a perspective view of the illustrative roasting device of FIG. 4A, with the roasting device rotated clockwise 90 degrees.

Referring now to FIGS. 4A and 4B, a further illustrative roasting device 200 includes a handle 204, a shaft 206, a food engagement assembly 202, and an operator actuation assembly 220. The food engagement assembly 202 is formed at one end of the shaft 206 opposite the handle 204 and further includes a skewer 230 and a cage 140 illustratively defined by a plurality of spirals 208 formed around the skewer 230. The tapered end point 232 of skewer 230 is adapted to secure a food item within an inner portion of the plurality of spirals 208. In use, the food item may engage the skewer 230 along a longitudinal axis 210 toward a proximal end 212 of the plurality of spirals 208 to be positioned within at least some inner portion of the plurality of spirals 208. As explained herein in more detail, in certain configurations, the operator actuation assembly 220 may be actuated to move a first stopper 224 toward a distal end 218 of plurality of spirals 208 along the longitudinal axis 210.

In the illustrative embodiment, the shaft 206, the skewer 230, and the plurality of spirals 208 are of a unitary construction. In particular, the shaft 206, the skewer 230, and the plurality of spirals 208 are formed from a stainless-steel wire. Such a wire should be of sufficient diameter so as to allow roasting device 200 to be sufficiently rigid for the cooking of a food item including, but not limited to, sausages, meats, and vegetables. However, it should be appreciated that, in some embodiments, the shaft 206, the skewer 230, and the plurality of spirals 208 may be separate components and/or may be made of different materials.

In the illustrative embodiment, the cage 140 is defined by the plurality of spirals 208, illustratively including a total of eight spirals concentrically aligned along a longitudinal axis 210. However, it should be appreciated that, in some embodiments, a roasting device may have a different number of spirals (e.g., fewer or more than eight) of the plurality of spirals 208. The end point 232 of skewer 230 is centered along the longitudinal axis 210. A first spiral 209 of plurality of spirals 208 is located at a proximal end of plurality of spirals 208 and has a shape of less than a full circle and connects the plurality of spirals to the skewer 230.

In the illustrative embodiment, the operator actuation assembly 220 includes an operator actuation input 214, a stopper 224, and rods 222 that extend between the stopper 224 and the operator actuation input 214. The operator actuation input 214 is adapted to control the operator actuation assembly 220 by reciprocally moving the rods 222. Specifically, the stopper 224 is attached to distal ends of the rods 222 and has a first aperture that is configured to receive the skewer 230. In use, the rods 222 and the stopper 224 are reciprocally movable within the plurality of spirals 208 along a common axis (i.e., the longitudinal axis 210). As described above, the food item may engage the skewer 230 along a longitudinal axis 210 toward a proximal end 212 of the plurality of spirals 208. The stopper 224 is adapted to prevent the food item from further sliding toward the proximal end of the skewer 230, such that the food item may positioned within the inner portion of the cage 140 as defined by the plurality of spirals 208.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A device for roasting a food item, comprising:
a shaft; and
a food engagement assembly comprising:
a pointed apparatus at one end of the shaft;

a plurality of spirals formed around the pointed apparatus, the pointed apparatus movable within the plurality of spirals; and an operator actuation assembly comprising:
at least one rod movable within the plurality of spirals; and
a stopper attached to one end of the at least one rod and having an aperture configured to receive the pointed apparatus; and
wherein the stopper is positioned within an inner portion of the plurality of spirals when the device is in a charged configuration.

2. The device of claim 1, further comprising an operator actuation input configured to control an operation configuration of the food engagement assembly, wherein the operation configuration includes a charged configuration and a released configuration.

3. The device of claim 2, wherein the stopper is positioned at a proximal end of the pointed apparatus in the charged configuration to allow a food item to engage the pointed apparatus within the plurality of spirals.

4. The device of claim 2, wherein the stopper is positioned at a distal end of the pointed apparatus in the released configuration to allow a food item to disengage from the pointed apparatus.

5. The device of claim 2, wherein the stopper is configured to move along the pointed apparatus toward a proximal end of the plurality of spirals upon a transition from the released configuration to the charted configuration.

6. The device of claim 2, wherein the stopper is configured to move along the pointed apparatus toward a distal end of the plurality of spirals upon a transition from the charged configuration to the released configuration.

7. The device of claim 1, further comprising a handle affixed to an end of the shaft opposite the pointed apparatus.

8. The device of claim 7, wherein the handle is a wooden handle.

9. The device of claim 1, wherein the shaft, the pointed apparatus, and the plurality of spirals are formed of a unitary construction.

10. The device of claim 1, wherein the plurality of spirals is concentrically aligned along a common axis.

11. The device of claim 10, wherein the pointed apparatus has an end point centered at the common axis of the plurality of spirals.

12. The device of claim 10, wherein the plurality of spirals has at least one spiral of lesser inner diameter than a remainder of the plurality of spirals.

13. The device of claim 12, wherein the at least one spiral of lesser inner diameter tapers toward a proximal end of the pointed apparatus.

14. The device of claim 12, wherein the operator actuation assembly further comprising a second stopper attached to a second end of the at least one rod movable along the common axis and having an aperture configured to receive the shaft.

15. The device of claim 1, wherein the operator actuation assembly is configured to shift the food engagement assembly from a charged configuration to a released configuration.

16. The device of claim 1, wherein the shaft, the pointed apparatus, and the plurality of spirals are made of stainless steel.

17. The device of claim 1, wherein each spiral of the plurality of spirals are connected to each other by a support member.

18. The device of claim 1, wherein the pointed apparatus includes at least one of a stick, a skewer, a fork, a sharpened material, or any combination thereof.

19. The device of claim 1, wherein the pointed apparatus is made of metal, wood, plastic or any combination thereof.

20. A device for roasting a food item, comprising:
a shaft; and
a food engagement assembly comprising:
a pointed apparatus at one end of the shaft;
a plurality of spirals formed around the pointed apparatus, the pointed apparatus movable within the plurality of spirals;
wherein the plurality of spirals is concentrically aligned among a common axis;
wherein the plurality of spirals has at least one spiral of lesser inner diameter than a remainder of the plurality of spirals; and
an operator actuation assembly comprising:
at least one rod movable within the plurality of spirals; and
a stopper attached to one end of the at least one rod and having an aperture configured to receive the pointed apparatus; and
wherein the stopper has a diameter greater than a diameter of the at least one spiral of lesser inner diameter, and lesser than the inner diameter of the remainder of the plurality of spirals.

21. A device for roasting a food item, comprising:
a shaft; and
a food engagement assembly comprising:
a pointed apparatus at one end of the shaft;
a plurality of spirals formed around the pointed apparatus, the pointed apparatus movable within the plurality of spirals;
wherein the plurality of spirals is concentrically aligned among a common axis;
wherein the plurality of spirals has at least one spiral of lesser inner diameter than a remainder of the plurality of spirals; and
an operator actuation assembly comprising:
at least one rod movable within the plurality of spirals; and
a stopper attached to one end of the at least one rod and having an aperture configured to receive the pointed apparatus;
wherein the operator actuation assembly further comprising a second stopper attached to a second end of the at least one rod movable along the common axis and having an aperture configured to receive the shaft; and
wherein the second stopper has a diameter greater than the at least one spiral of lesser inner diameter, and wherein the at least one spiral of lesser inner diameter restricts the entry of the second stopper toward the plurality of spirals.

* * * * *